US012346158B1

(12) United States Patent
Huang

(10) Patent No.: US 12,346,158 B1
(45) Date of Patent: Jul. 1, 2025

(54) SMART GLASSES DEVICE, REAL-TIME FEEDBACK GENERATING METHOD, AND NON-TRANSITORY COMPUTER READABLE STORAGE MEDIUM THEREOF

(71) Applicant: HTC Corporation, Taoyuan (TW)

(72) Inventor: Pei-Pin Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/679,496

(22) Filed: May 31, 2024

(51) Int. Cl.
*G06F 1/16* (2006.01)
*G01K 3/10* (2006.01)
*G01K 3/14* (2006.01)
*G02B 27/01* (2006.01)
*G02C 11/00* (2006.01)
*H04N 23/60* (2023.01)

(52) U.S. Cl.
CPC ............... *G06F 1/163* (2013.01); *G01K 3/10* (2013.01); *G01K 3/14* (2013.01); *G02B 27/017* (2013.01); *G02C 11/10* (2013.01); *H04N 23/64* (2023.01); *G02B 2027/0138* (2013.01); *G02B 2027/014* (2013.01); *G02B 2027/0178* (2013.01)

(58) Field of Classification Search
CPC . G06F 1/163; G01K 3/10; G01K 3/14; G02B 27/017; G02B 2027/0138; G02B 2027/014; G02B 2027/0178; G02C 11/10; H04N 23/64
See application file for complete search history.

(56) References Cited

U.S. PATENT DOCUMENTS

| | | | |
|---|---|---|---|
| 8,890,773 B1 * | 11/2014 | Pederson | H04B 1/385 345/8 |
| 9,955,862 B2 * | 5/2018 | Freeman | G16H 10/60 |
| 11,215,846 B1 * | 1/2022 | Pomes | H04N 13/254 |
| 11,284,058 B2 * | 3/2022 | Tsau | H04N 13/296 |
| 11,575,877 B2 * | 2/2023 | Tsau | H04N 13/296 |
| 11,688,101 B2 * | 6/2023 | Birklbauer | H04N 17/002 348/187 |
| 12,244,920 B2 * | 3/2025 | Wan | H04N 23/651 |
| 2011/0043644 A1 * | 2/2011 | Munger | H04N 13/122 348/207.1 |
| 2015/0153831 A1 * | 6/2015 | Kim | G06F 3/14 345/156 |
| 2016/0269999 A1 * | 9/2016 | Hwang | H04W 52/0274 |
| 2016/0270656 A1 * | 9/2016 | Samec | A61B 3/1035 |
| 2018/0329484 A1 * | 11/2018 | Steedly | A63F 13/42 |
| 2019/0101977 A1 * | 4/2019 | Armstrong-Muntner | G06N 20/00 |
| 2019/0188296 A1 * | 6/2019 | Innes | G06F 16/248 |
| 2020/0228692 A1 * | 7/2020 | Wakamatsu | H04N 23/695 |
| 2020/0413028 A1 * | 12/2020 | Tsau | H04N 23/52 |
| 2021/0035396 A1 * | 2/2021 | Tiwari | G07C 9/29 |
| 2021/0118255 A1 * | 4/2021 | Tiwari | G06V 40/28 |
| 2022/0008746 A1 * | 1/2022 | Malchano | A61B 5/4088 |

(Continued)

*Primary Examiner* — Benyam Ketema

(74) *Attorney, Agent, or Firm* — CKC & Partners Co., LLC

(57) ABSTRACT

A smart glasses device, real-time feedback generating method, and non-transitory computer readable storage medium thereof are provided. The device determines whether a temperature change corresponding to a plurality of temperature values in a first time interval is greater than a threshold value. The device activates a image capturing device to generate at least one real-time image corresponding to a second time interval. The device generates a real-time feedback based on the at least one real-time image.

20 Claims, 5 Drawing Sheets

(56) References Cited

U.S. PATENT DOCUMENTS

| | | | | |
|---|---|---|---|---|
| 2022/0377063 A1* | 11/2022 | Gomi | .................... | H04L 9/3271 |
| 2023/0201518 A1* | 6/2023 | Ruttenberg | ............ | G16H 50/30 |
| | | | | 600/27 |
| 2023/0388592 A1* | 11/2023 | Lee | .................... | H04N 21/4852 |
| 2024/0171726 A1* | 5/2024 | Hernandez | ........... | H04N 13/366 |

* cited by examiner

SMART GLASSES DEVICE, REAL-TIME FEEDBACK GENERATING METHOD, AND NON-TRANSITORY COMPUTER READABLE STORAGE MEDIUM THEREOF

BACKGROUND

Field of Invention

The present invention relates to a smart glasses device, real-time feedback generating method, and non-transitory computer readable storage medium thereof. More particularly, the present invention relates to a smart glasses device, real-time feedback generating method, and non-transitory computer readable storage medium thereof that can generate real-time feedback to remind the user.

Description of Related Art

In ordinary life, due to the complexity of users' daily affairs, users usually need to record many daily chores and to-do events by themselves to avoid forgetting to perform some necessary tasks. For example, users need to record information such as the inventory status of food in the refrigerator or the shelf life of food.

However, under the current technology, most of the to-do events and information in daily life still relies on the user to manually record it through a device (such as a mobile device). Due to the lack of an automatic reminder mechanism, users need to turn on the reading history by themselves.

Accordingly, there is an urgent need for a real-time feedback generating technology that can generate real-time feedback to remind users.

SUMMARY

An objective of the present disclosure is to provide a smart glasses device. The smart glasses device comprises a temperature sensor, an image capturing device, and a processor. The processor is electrically connected to the temperature sensor and the image capturing device. The temperature sensor is configured to sense a plurality of temperature values. The processor determines whether a temperature change corresponding to the temperature values in a first time interval is greater than a threshold value. In response to the temperature change corresponding to the temperature values of the first time interval being greater than the threshold value, the processor activates the image capturing device to generate at least one real-time image corresponding to a second time interval. The processor generates a real-time feedback based on the at least one real-time image.

Another objective of the present disclosure is to provide a real-time feedback generating method, which is adapted for use in a smart glasses device. The smart glasses device comprises a temperature sensor, an image capturing device, and a processor, the temperature sensor is configured to sense a plurality of temperature values. The real-time feedback generating method comprises the following steps: determining whether a temperature change corresponding to the temperature values in a first time interval is greater than a threshold value; in response to the temperature change corresponding to the temperature values of the first time interval being greater than the threshold value, activating the image capturing device to generate at least one real-time image corresponding to a second time interval; and generating a real-time feedback based on the at least one real-time image.

A further objective of the present disclosure is to provide a non-transitory computer readable storage medium having a computer program stored therein. The computer program comprises a plurality of codes, the computer program executes a real-time feedback generating method after being loaded into an electronic device. The electronic device comprises a temperature sensor, an image capturing device, and a processor, and the temperature sensor is configured to sense a plurality of temperature values. The real-time feedback generating method comprises the following steps: determining whether a temperature change corresponding to the temperature values in a first time interval is greater than a threshold value; in response to the temperature change corresponding to the temperature values of the first time interval being greater than the threshold value, activating the image capturing device to generate at least one real-time image corresponding to a second time interval; and generating a real-time feedback based on the at least one real-time image.

According to the above descriptions, the real-time feedback generating technology (at least including the device, the method, and the non-transitory computer readable storage medium) provided by the present disclosure can actively determine whether to take a real-time image based on changes in the sensed temperature, and when it is determined based on the real-time image that the user has specific behaviors/actions, instantly generate appropriate real-time feedback to users. In addition, the real-time feedback generating technology provided in the present disclosure also provides a variety of determining conditions to further provide different types of real-time feedback and applications, providing users with real-time reminder mechanisms and appropriate information. Therefore, the present disclosure improves the determining accuracy of real-time feedback generating technology, reduces unnecessary computing resource consumption (i.e., there is no need to analyze all real-time images), solves the shortcomings of the existing technology, and the user's service experience is improved.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a smart glasses device, real-time feedback generating method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
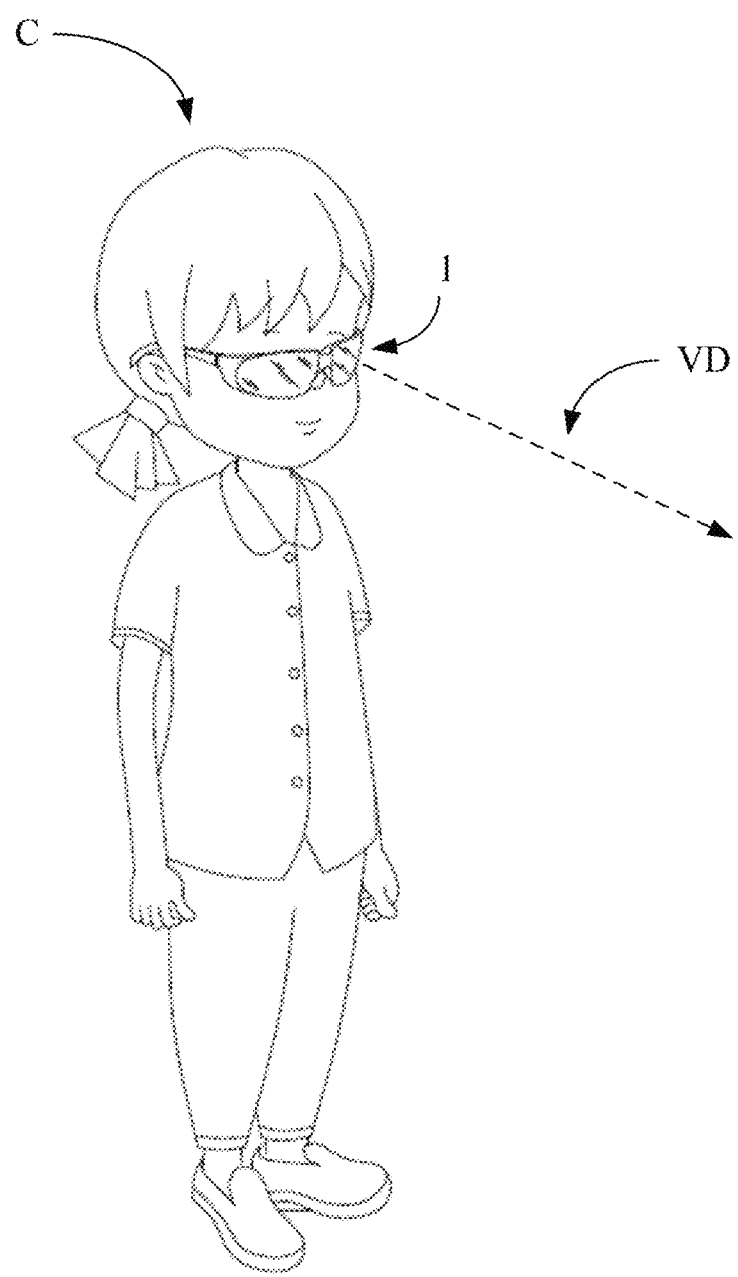
FIG. 1 is a schematic diagram depicting the applicable scenario of the smart glasses device of the first embodiment.

First, the applicable scenario of the present embodiment will be described, and a schematic diagram of which is depicted in FIG. 1. As shown in FIG. 1, in the application environment of the present disclosure, the user C can use the smart glasses device 1 to perform daily activities, and the smart glasses device 1 may generate real-time feedback to remind the user C at the appropriate time.

Figure 2A:
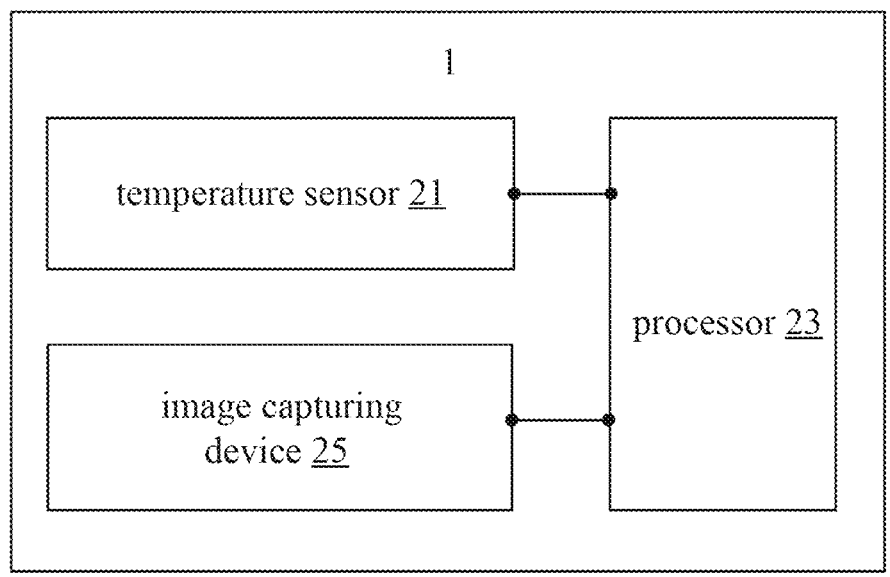
FIG. 2A is a schematic diagram depicting the structure of the smart glasses device of some embodiments.

In the present embodiment, a schematic diagram of the structure of the smart glasses device 1 is depicted in FIG. 2A. The smart glasses device 1 comprises a temperature sensor 21, a processor 23, and an image capturing device 25. The processor 23 is electrically connected to the temperature sensor 21 and the image capturing device 25.

In the present embodiment, the temperature sensor 21 is configured to sense a plurality of temperature values, and the image capturing device 25 is configured to capture a real-time image corresponding to a field of view (FOV).

It shall be appreciated that the temperature sensor 21 may continuously generate a series of temperature sensing data (e.g., a stream of temperature sensing data generated at a frequency of 5 times per second). During operation, the processor 23 may periodically receive the temperature sensing data from the temperature sensor 21.

Figure 3:
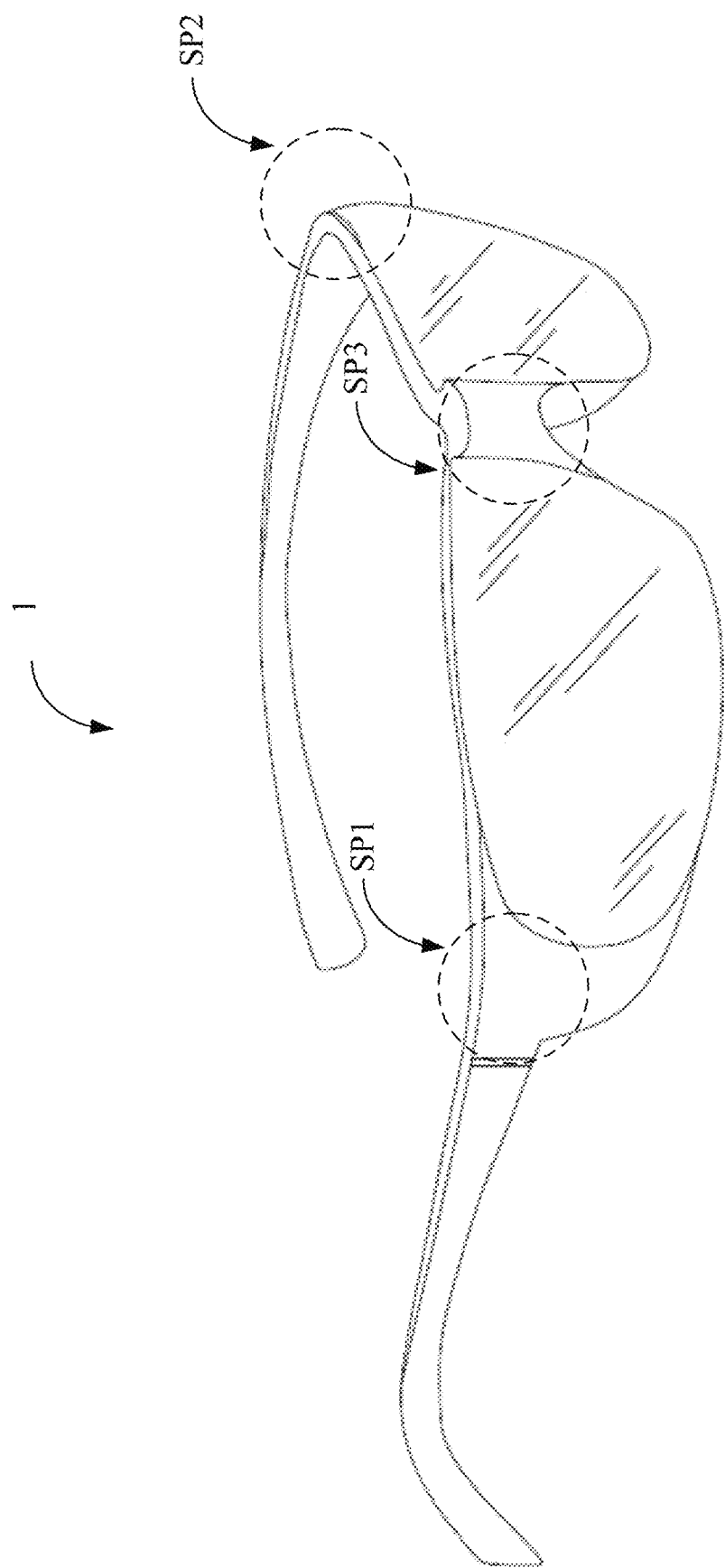
FIG. 3 is a schematic diagram depicting the smart glasses device of some embodiments.

In some embodiments, a schematic diagram of the smart glasses device 1 is depicted in FIG. 3. As shown in FIG. 3, the temperature sensor 21 and the image capturing device 25 can be disposed at the setting position SP1, SP2 or SP3 in FIG. 3.

For example, as the viewing direction VD of the user C shown in FIG. 1, the temperature sensor 21 and the image capturing device 25 can be set based on the viewing direction VD of the user C (i.e., facing the same direction as the user's viewing direction VD).

In some embodiments, when the real-time feedback operation requires measuring the temperature of the environment, the temperature sensor 21 can be used to sense the temperature of the environment where the user C is (e.g., the temperature of the surrounding air). Specifically, the temperature sensor 21 is an ambient temperature sensor (e.g., an air temperature sensor), and the ambient temperature sensor is configured to sense the temperature values corresponding to a surrounding environment of the smart glasses device 1.

In some embodiments, when the real-time feedback operation requires measuring the temperature of a specific object, the temperature sensor 21 can be used to sense the temperature of the object in front of the user C's viewing angle (e.g., the temperature of the object). Specifically, the temperature sensor 21 is a directional temperature sensor (e.g., an infrared temperature sensor), and the directional temperature sensor is configured to sense the temperature values corresponding to a viewing direction VD of the smart glasses device 1.

Figure 2B:
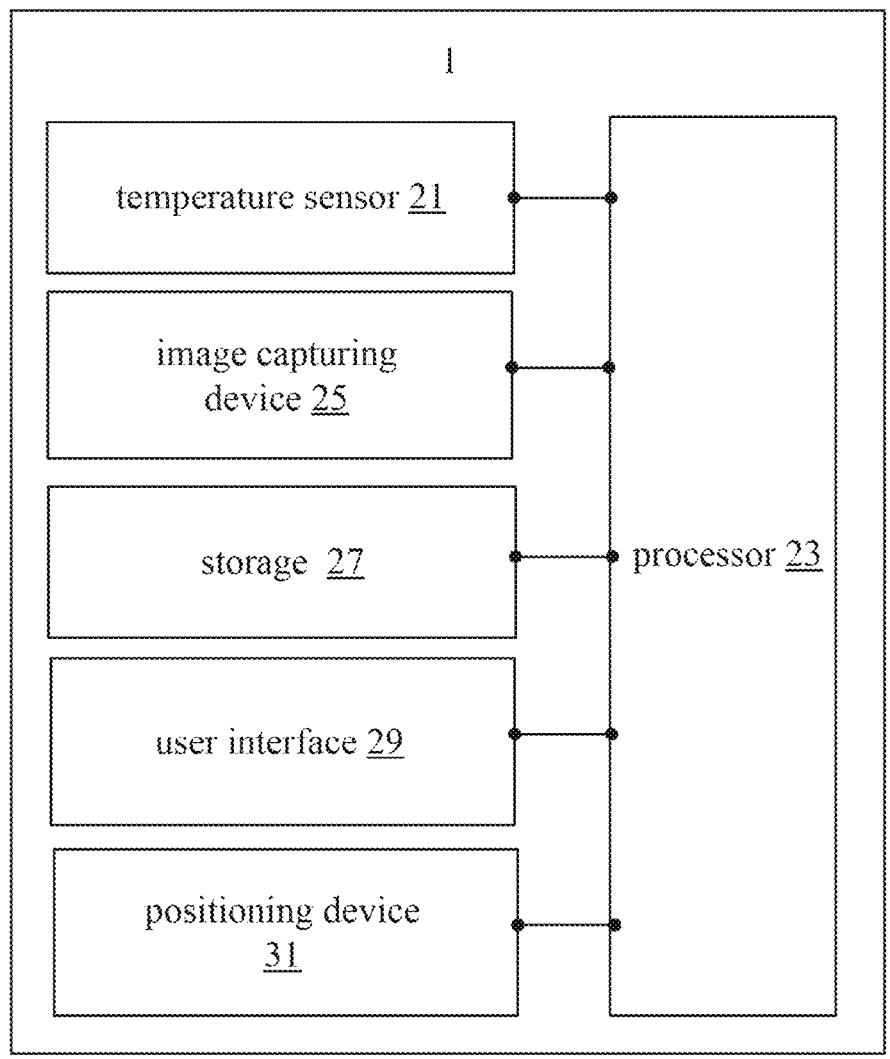
FIG. 2B is a schematic diagram depicting the structure of the smart glasses device of some embodiments.

In some embodiments, as shown in FIG. 2B, the smart glasses device 1 further comprises a storage 27, a user interface 29, and a positioning device 31.

It shall be appreciated that the processor 23 may be any of various processors, Central Processing Units (CPUs), microprocessors, digital signal processors or other computing apparatuses known to those of ordinary skill in the art. The image capturing device 25 may be any device with the function of generating images (e.g., a camera). The storage 27 may be a memory, a Universal Serial Bus (USB) disk, a hard disk, a Compact Disk (CD), a mobile disk, or any other storage medium or circuit known to those of ordinary skill in the art and having the same functionality. The user interface 29 may be any device that can interact with the user. The positioning device 31 may be any device with positioning function, such as: Global Positioning System (GPS), WiFi positioning device, etc.

It shall be appreciated that the user interface 29 is configured to play the real-time feedback generated by the processor 23. In some embodiments, when the user interface 29 is a display (e.g., a display screen on a lens), the real-time feedback interaction provides visual feedback through the display. In some embodiments, when the user interface 29 is a speaker, the real-time feedback interaction is to play sound feedback through the speaker.

In the present embodiment, the processor 23 determines whether a temperature change corresponding to the temperature values in a first time interval (e.g., a time interval of 5 seconds) is greater than a threshold value (e.g., 5 degrees of Celsius temperature).

Next, in response to the temperature change corresponding to the temperature values of the first time interval being greater than the threshold, the processor 23 activates the image capturing device 25 to generate at least one real-time image corresponding to a second time interval.

In some embodiments, the first time interval may be a dynamic adjustment interval, and the second time interval may partially overlap with the first time interval. In some embodiments, the second time interval may be a part of the first time interval.

In some embodiments, in order to save computing resources and improve the accuracy of determination, the processor 23 may activate the image capturing device 25 for shooting only when determining the location information of the smart glasses device 1 matches a predetermined area.

Specifically, the smart glasses device 1 stores a first location information corresponding to each of a plurality of preset areas. Next, the processor 23 determines whether a second location information of the smart glasses device 1 is located in a first area among the preset areas. Then, in response to the temperature change corresponding to the temperature values of the first time interval being greater than the threshold value and the second location information of the smart glasses device 1 being located in the first area, the processor 23 activates the image capturing device 25 to generate the at least one real-time image corresponding to the second time interval.

In some embodiments, in order to make the computer vision recognition of the environment or actions of the user more accurate, the processor 23 may send a control signal to activate the image capturing device 25 to capture continuous images. The continuous images are used to perform subsequent real-time image analysis operations. Specifically, the processor 23 activates the image capturing device 25 to capture a continuous image corresponding to the second time interval to generate the at least one real-time image.

Finally, the processor 23 generates a real-time feedback based on the at least one real-time image. The real-time feedback may comprise a recording operation, a reminder operation, or an assistance operation. For ease of understanding, several examples of ways for the processor 23 to generate the real-time feedback based on the at least one real-time image will be illustrated below.

In some embodiments, the processor 23 may input the at least one real-time image to a convolutional neural network (e.g., a trained convolutional neural network) to determine the behavior corresponding to the user C, so as to generate corresponding real-time feedback.

In some embodiments, when a specific object appears in the real-time image, the processor 23 can actively compare the difference between the real-time image and the historical image to generate the real-time feedback. Specifically, the processor 23 determines whether the at least one real-time image includes a target object. Then, in response to the at least one real-time image including the target object, the processor 23 compares the at least one real-time image with a historical image corresponding to the target object to generate image comparison information. Finally, the processor 23 generates the real-time feedback based on the image comparison information.

For example, when the processor 23 determines that the target object refrigerator appears in the real-time image, the processor 23 compares the real-time image with the historical image of the refrigerator 3 days ago to analyze the difference in image content (e.g., consumption status of the food inventory), and generate corresponding real-time feedback (e.g., reporting on food consumption status, food inventory status, food ingredients that need to be replenished).

For another example, the processor 23 can actively record the food information such as the date the food was put into the refrigerator, the food expiration date (e.g., by scanning the barcode of the food), etc. based on the at least one real-time image, and store the information in the storage 27.

In some embodiments, after determining that the smart glasses device 1 has left the preset area (e.g., from indoor to outdoor), the processor 23 actively reminds the user C of the corresponding reminder information through the smart glasses device 1. Specifically, the smart glasses device 1 stores an area image set corresponding to each of a plurality of preset areas (e.g., a plurality of area images), and each of the preset areas corresponds to a reminder information. Next, the processor 23 compares the at least one real-time image and the area image set of each of the preset areas to determine whether the smart glasses device is moved out of a second area of the preset areas. Finally, in response to determining that the smart glasses device is moved out of the second area among the preset areas, the processor 23 generates the real-time feedback based on the reminder information corresponding to the second area.

For example, when the user C leaves the office area, the change of area may cause a rapid change in the ambient temperature. When the processor 23 determines that the change in temperature is higher than the threshold, the processor 23 may activate the image capturing device 25 to capture real-time images for analysis. Then, when the processor 23 determines that the smart glasses device 1 has left the office area, the processor 23 actively reminds the user C to "bring relevant items home" through the smart glasses device 1.

In some embodiments, the processor 23 may further determine the activating function to be used based on the location information of the smart glasses device 1. Specifically, the processor 23 determines a first activation function corresponding to a second location information from a plurality of activation functions based on the at least one real-time image and the second location information of the smart glasses device 1 to generate a real-time feedback corresponding to the first activating function.

For example, when the processor 23 determines that the location information of the smart glasses device 1 is currently a refrigerator located in a shopping mall, the activating function determined by the processor 23 may be a key information reminder, and the corresponding real-time feedback is generated (e.g., real-time feedback such as the information that "The milk in the mall is on sale", "The milk at home needs to be replenished", etc.). In some embodiments, the smart glasses device 1 may receive shopping information such as the mall's product information, advertising information, product special offer information, etc., in real time from the server of the mall by connecting to the mobile device.

For another example, when the processor 23 determines that the location information of the smart glasses device 1 is currently a refrigerator located at home, the activating function determined by the processor 23 may include the operation of comparing the real-time image with the historical image of the refrigerator 3 days ago to analyze the difference in image content (e.g., consumption status of the food inventory), and the operation of generating corresponding real-time feedback (e.g., reporting on food consumption status, food inventory status, food ingredients that need to be replenished).

According to the above descriptions, the smart glasses device 1 provided by the present disclosure can actively determine whether to take a real-time image based on changes in the sensed temperature, and when it is determined based on the real-time image that the user has specific behaviors/actions, instantly generate appropriate real-time feedback to users. In addition, the smart glasses device 1 provided in the present disclosure also provides a variety of determining conditions to further provide different types of real-time feedback and applications, providing users with real-time reminder mechanisms and appropriate information. Therefore, the present disclosure improves the determining accuracy of real-time feedback generating technology, reduces unnecessary computing resource consumption (i.e., there is no need to analyze all real-time images), solves the shortcomings of the existing technology, and the user's service experience is improved.

Figure 4:
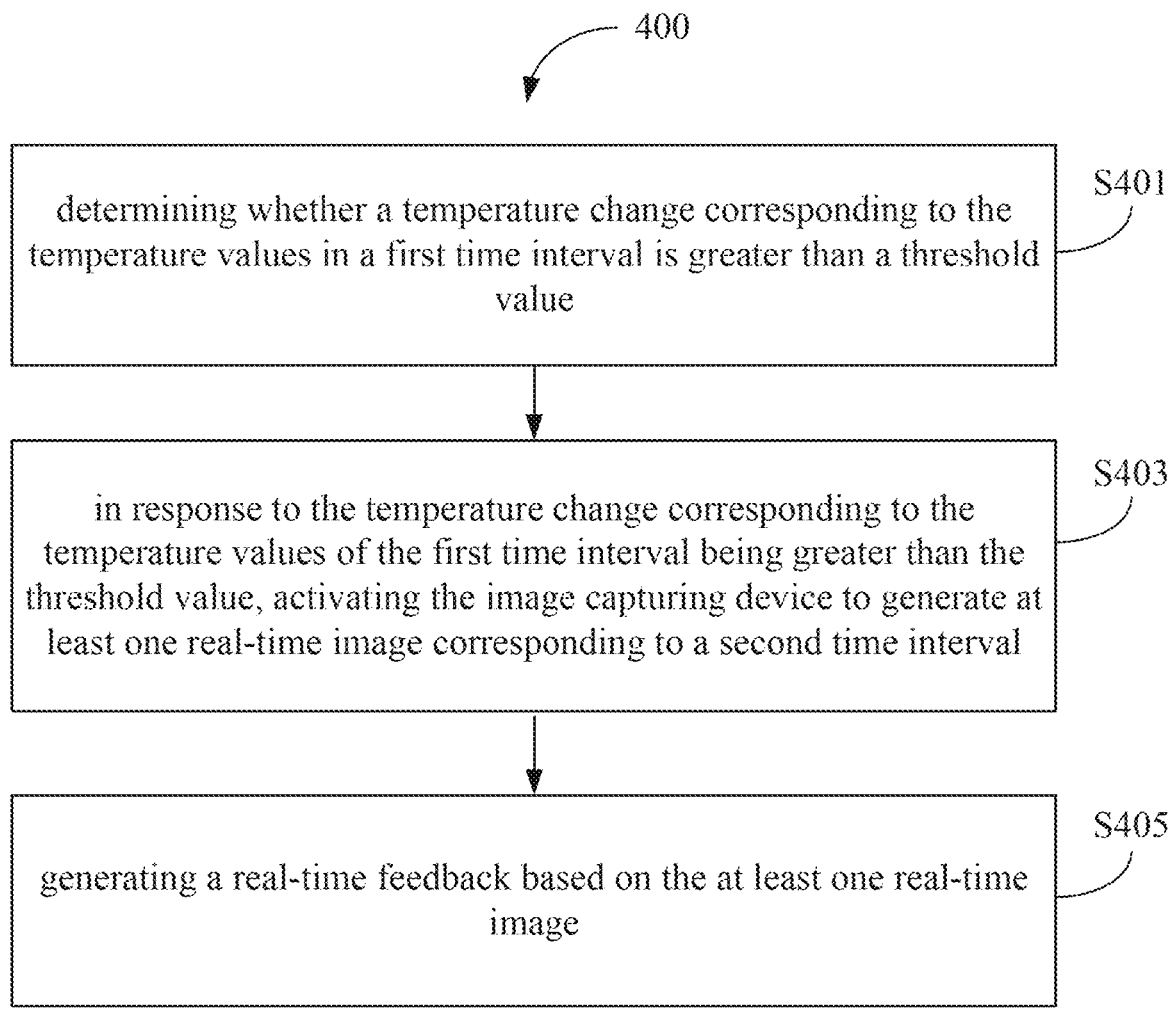
FIG. 4 is a partial flowchart depicting the real-time feedback generating method of the second embodiment.

A second embodiment of the present disclosure is a real-time feedback generating method and a flowchart thereof is depicted in FIG. 4. The real-time feedback generating method 400 is adapted for a smart glasses device (e.g., the smart glasses device 1 described in the first embodiment). The smart glasses device comprises a temperature sensor, an image capturing device, and a processor (e.g., the temperature sensor 21, the image capturing device 25, and the processor 23 described in the first embodiment). The temperature sensor is configured to sense a plurality of temperature values. The real-time feedback generating method 400 generates a real-time feedback through the steps S401 to S405.

In the step S401, the smart glasses device determines whether a temperature change corresponding to the temperature values in a first time interval is greater than a threshold value.

Next, in the step S403, in response to the temperature change corresponding to the temperature values of the first time interval being greater than the threshold value, the smart glasses device activates the image capturing device to generate at least one real-time image corresponding to a second time interval.

Finally, in the step S405, the smart glasses device generates a real-time feedback based on the at least one real-time image.

In some embodiments, the temperature sensor is an ambient temperature sensor, and the ambient temperature sensor is configured to sense the temperature values corresponding to a surrounding environment of the smart glasses device.

In some embodiments, the temperature sensor is a directional temperature sensor, and the directional temperature sensor is configured to sense the temperature values corresponding to a viewing direction of the smart glasses device.

In some embodiments, the step of generating the at least one real-time image corresponding to the second time interval comprises the following steps: activating the image capturing device to capture a continuous image corresponding to the second time interval to generate the at least one real-time image.

In some embodiments, the smart glasses device stores a first location information corresponding to each of a plurality of preset areas, and the step of activating the image capturing device to generate the at least one real-time image corresponding to the second time interval further comprises the following steps: determining whether a second location information of the smart glasses device is located in a first area among the preset areas; and in response to the temperature change corresponding to the temperature values of the first time interval being greater than the threshold value and the second location information of the smart glasses device being located in the first area, activating the image capturing device to generate the at least one real-time image corresponding to the second time interval.

In some embodiments, the smart glasses device stores an area image set corresponding to each of a plurality of preset areas, each of the preset areas corresponds to a reminder information, and the step of generating the real-time feedback further comprises the following steps: comparing the at least one real-time image and the area image set of each of the preset areas to determine whether the smart glasses device is moved out of a second area of the preset areas; and in response to determining that the smart glasses device is moved out of the second area among the preset areas, generating the real-time feedback based on the reminder information corresponding to the second area.

In some embodiments, the real-time feedback generating method 400 further comprises the following steps: determining, based on the at least one real-time image and a second location information of the smart glasses device, a first activating function corresponding to the second location information from a plurality of activating functions to generate a real-time feedback corresponding to the first activating function.

In some embodiments, the step of generating the real-time feedback comprises the following steps: determining whether the at least one real-time image includes a target object; in response to the at least one real-time image including the target object, comparing the at least one real-time image with a historical image corresponding to the target object to generate an image comparison information; and generating the real-time feedback based on the image comparison information.

In some embodiments, the smart glasses device further comprises a user interface, and the user interface is configured to play the real-time feedback.

In addition to the aforesaid steps, the second embodiment can also execute all the operations and steps of the smart glasses device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The real-time feedback generating method described in the second embodiment may be implemented by a computer program having a plurality of codes. The computer program may be a file that can be transmitted over the network, or may be stored into a non-transitory computer readable storage medium. After the codes of the computer program are loaded into an electronic device (e.g., the smart glasses device 1), the computer program executes the real-time feedback generating method as described in the second embodiment.

The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the time interval, the activating function, the location information, the area, etc.) are preceded by terms such as "first" or "second", and these terms of "first" or "second" are only used to distinguish these different words. For example, the "first" and "second" time intervals are only used to indicate the time interval used in different operations.

According to the above descriptions, the real-time feedback generating technology (at least including the device, the method, and the non-transitory computer readable storage medium) provided by the present disclosure can actively determine whether to take a real-time image based on changes in the sensed temperature, and when it is determined based on the real-time image that the user has specific behaviors/actions, instantly generate appropriate real-time feedback to users. In addition, the real-time feedback generating technology provided in the present disclosure also provides a variety of determining conditions to further provide different types of real-time feedback and applications, providing users with real-time reminder mechanisms and appropriate information. Therefore, the present disclosure improves the determining accuracy of real-time feedback generating technology, reduces unnecessary computing resource consumption (i.e., there is no need to analyze all real-time images), solves the shortcomings of the existing technology, and the user's service experience is improved.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A smart glasses device, comprising:
a temperature sensor, being configured to sense a plurality of temperature values;
an image capturing device; and
a processor, being electrically connected to the temperature sensor and the image capturing device, and being configured to perform the following operations:
   determining whether a temperature change corresponding to the temperature values in a first time interval is greater than a threshold value;
   in response to the temperature change corresponding to the temperature values of the first time interval being greater than the threshold value, activating the image capturing device to generate at least one real-time image corresponding to a second time interval; and
   generating a real-time feedback based on the at least one real-time image.

2. The smart glasses device of claim 1, wherein the temperature sensor is an ambient temperature sensor, and the ambient temperature sensor is configured to sense the temperature values corresponding to a surrounding environment of the smart glasses device.

3. The smart glasses device of claim 1, wherein the temperature sensor is a directional temperature sensor, and the directional temperature sensor is configured to sense the temperature values corresponding to a viewing direction of the smart glasses device.

4. The smart glasses device of claim 1, wherein the operation of generating the at least one real-time image corresponding to the second time interval comprises the following operations:
   activating the image capturing device to capture a continuous image corresponding to the second time interval to generate the at least one real-time image.

5. The smart glasses device of claim 1, wherein the smart glasses device stores a first location information corresponding to each of a plurality of preset areas, and the operation of activating the image capturing device to generate the at least one real-time image corresponding to the second time interval further comprises the following operations:
   determining whether a second location information of the smart glasses device is located in a first area among the preset areas; and
   in response to the temperature change corresponding to the temperature values of the first time interval being greater than the threshold value and the second location information of the smart glasses device being located in the first area, activating the image capturing device to generate the at least one real-time image corresponding to the second time interval.

6. The smart glasses device of claim 1, wherein the smart glasses device stores an area image set corresponding to each of a plurality of preset areas, each of the preset areas corresponds to a reminder information, and the operation of generating the real-time feedback further comprises the following operations:
   comparing the at least one real-time image and the area image set of each of the preset areas to determine whether the smart glasses device is moved out of a second area of the preset areas; and
   in response to determining that the smart glasses device is moved out of the second area among the preset areas, generating the real-time feedback based on the reminder information corresponding to the second area.

7. The smart glasses device of claim 1, wherein the processor further performs the following operations:
   determining, based on the at least one real-time image and a second location information of the smart glasses device, a first activating function corresponding to the second location information from a plurality of activating functions to generate a real-time feedback corresponding to the first activating function.

8. The smart glasses device of claim 1, wherein the operation of generating the real-time feedback comprises the following operations:
   determining whether the at least one real-time image includes a target object;
   in response to the at least one real-time image including the target object, comparing the at least one real-time image with a historical image corresponding to the target object to generate an image comparison information; and
   generating the real-time feedback based on the image comparison information.

9. The smart glasses device of claim 1, wherein the smart glasses device further comprises:
   a user interface, being electrically connected to the processor, and the user interface is configured to play the real-time feedback.

10. The smart glasses device of claim 9, wherein the user interface is a display or a speaker.

11. A real-time feedback generating method, being adapted for use in a smart glasses device, wherein the smart glasses device comprises a temperature sensor, an image capturing device, and a processor, the temperature sensor is configured to sense a plurality of temperature values, and the real-time feedback generating method comprises:
   determining whether a temperature change corresponding to the temperature values in a first time interval is greater than a threshold value;
   in response to the temperature change corresponding to the temperature values of the first time interval being greater than the threshold value, activating the image capturing device to generate at least one real-time image corresponding to a second time interval; and
   generating a real-time feedback based on the at least one real-time image.

12. The real-time feedback generating method of claim 11, wherein the temperature sensor is an ambient temperature sensor, and the ambient temperature sensor is configured to sense the temperature values corresponding to a surrounding environment of the smart glasses device.

13. The real-time feedback generating method of claim 11, wherein the temperature sensor is a directional temperature sensor, and the directional temperature sensor is configured to sense the temperature values corresponding to a viewing direction of the smart glasses device.

14. The real-time feedback generating method of claim 11, wherein the step of generating the at least one real-time image corresponding to the second time interval comprises the following steps:
   activating the image capturing device to capture a continuous image corresponding to the second time interval to generate the at least one real-time image.

15. The real-time feedback generating method of claim 11, wherein the smart glasses device stores a first location information corresponding to each of a plurality of preset areas, and the step of activating the image capturing device to generate the at least one real-time image corresponding to the second time interval further comprises the following steps:

determining whether a second location information of the smart glasses device is located in a first area among the preset areas; and in response to the temperature change corresponding to the temperature values of the first time interval being greater than the threshold value and the second location information of the smart glasses device being located in the first area, activating the image capturing device to generate the at least one real-time image corresponding to the second time interval.

16. The real-time feedback generating method of claim 11, wherein the smart glasses device stores an area image set corresponding to each of a plurality of preset areas, each of the preset areas corresponds to a reminder information, and the step of generating the real-time feedback further comprises the following steps:

comparing the at least one real-time image and the area image set of each of the preset areas to determine whether the smart glasses device is moved out of a second area of the preset areas; and in response to determining that the smart glasses device is moved out of the second area among the preset areas, generating the real-time feedback based on the reminder information corresponding to the second area.

17. The real-time feedback generating method of claim 11, wherein the real-time feedback generating method further comprises the following steps:

determining, based on the at least one real-time image and a second location information of the smart glasses device, a first activating function corresponding to the second location information from a plurality of activating functions to generate a real-time feedback corresponding to the first activating function.

18. The real-time feedback generating method of claim 11, wherein the step of generating the real-time feedback comprises the following steps:

determining whether the at least one real-time image includes a target object;

in response to the at least one real-time image including the target object, comparing the at least one real-time image with a historical image corresponding to the target object to generate an image comparison information; and generating the real-time feedback based on the image comparison information.

19. The real-time feedback generating method of claim 11, wherein the smart glasses device further comprises a user interface, and the user interface is configured to play the real-time feedback.

20. A non-transitory computer readable storage medium, having a computer program stored therein, wherein the computer program comprises a plurality of codes, the computer program executes a real-time feedback generating method after being loaded into an electronic device, the electronic device comprises a temperature sensor, an image capturing device, and a processor, the temperature sensor is configured to sense a plurality of temperature values, and the real-time feedback generating method comprises:

determining whether a temperature change corresponding to the temperature values in a first time interval is greater than a threshold value;

in response to the temperature change corresponding to the temperature values of the first time interval being greater than the threshold value, activating the image capturing device to generate at least one real-time image corresponding to a second time interval; and generating a real-time feedback based on the at least one real-time image.

\* \* \* \* \*